F. LAHR.
CUTTER FOR POTATO PLANTERS.
APPLICATION FILED AUG. 19, 1914.

1,137,870.

Patented May 4, 1915.
5 SHEETS—SHEET 1.

Witnesses
Jas. L. Butler,
G. L. McClintock

Inventor
FRANK LAHR.

By C. E. Humphrey
Attorney

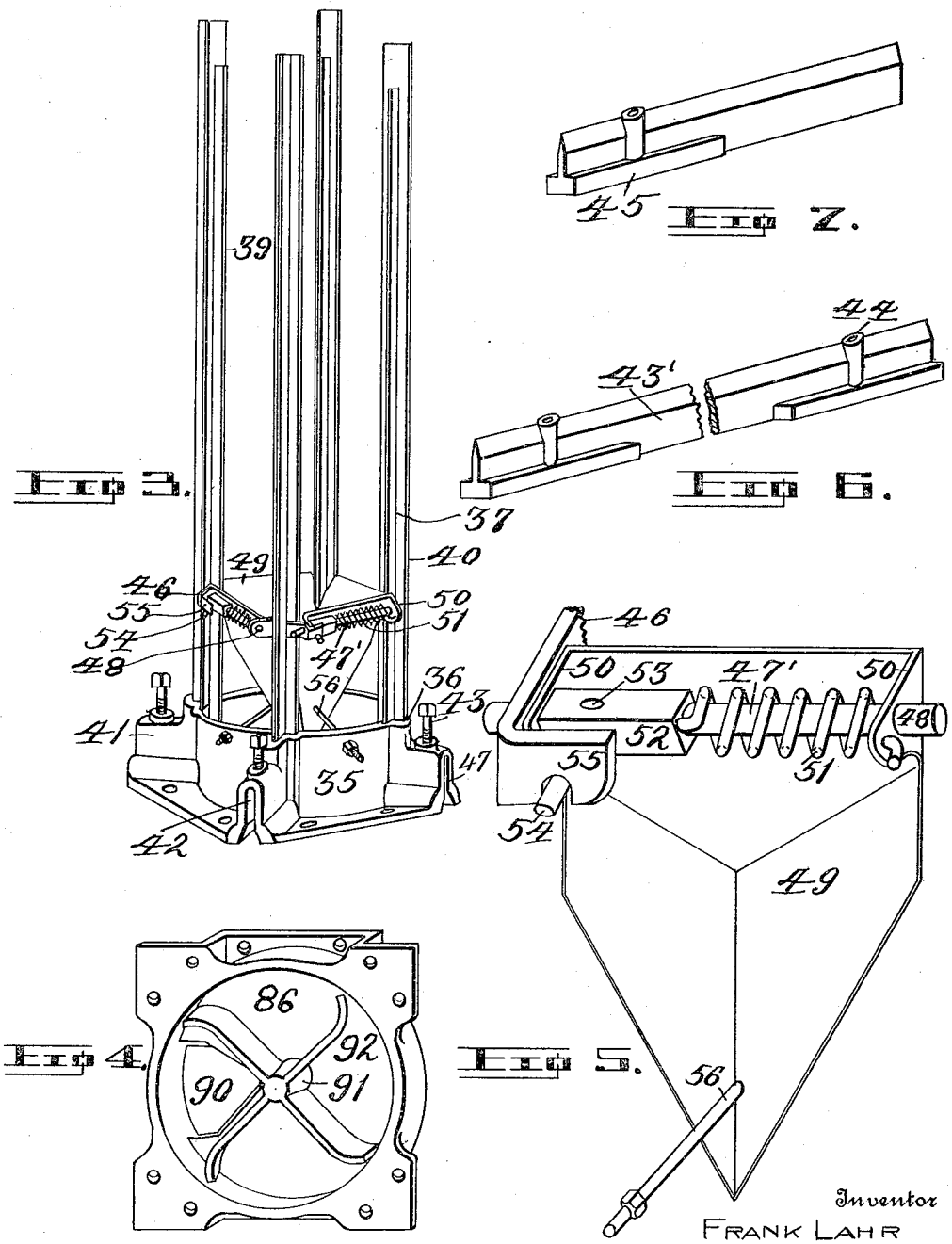

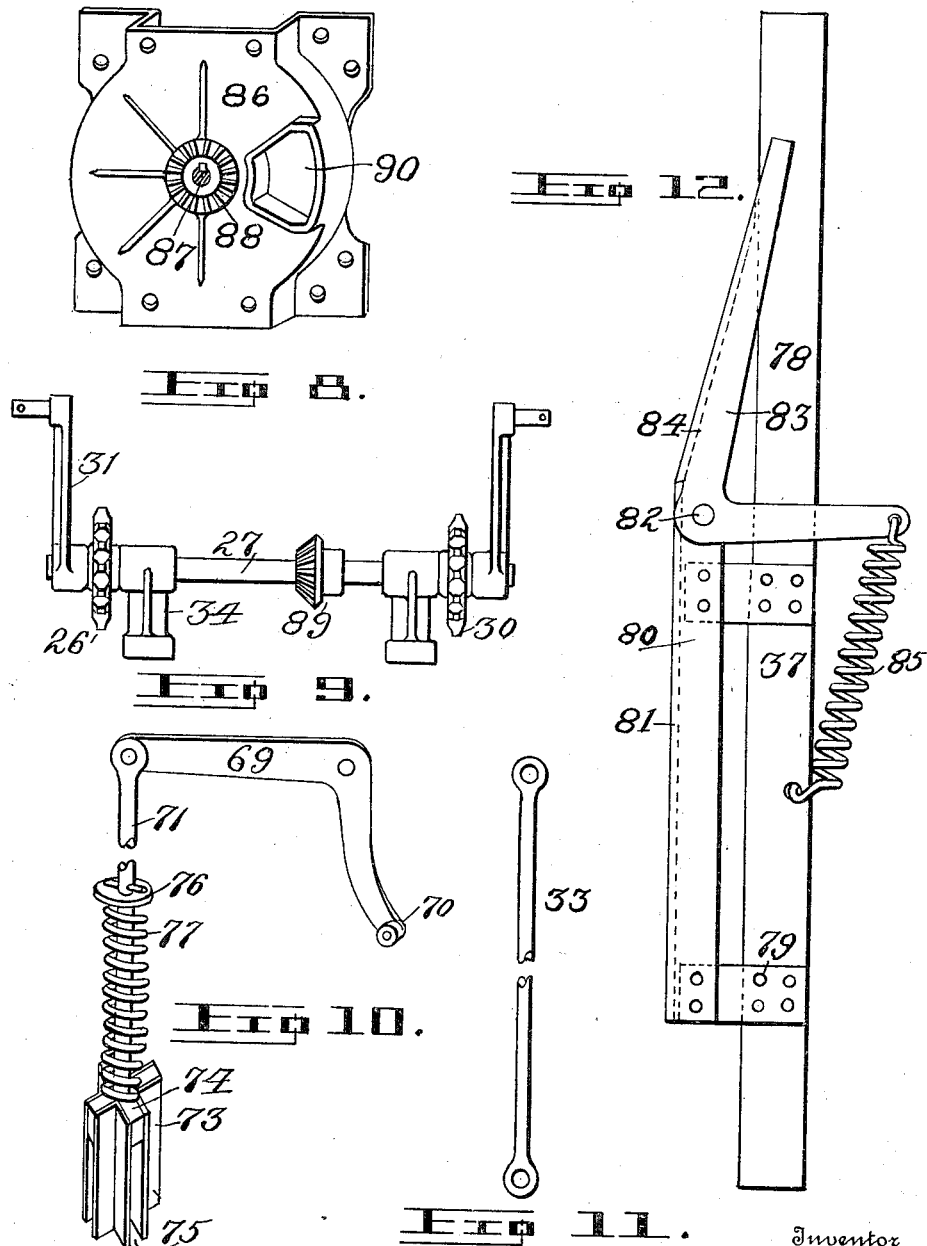

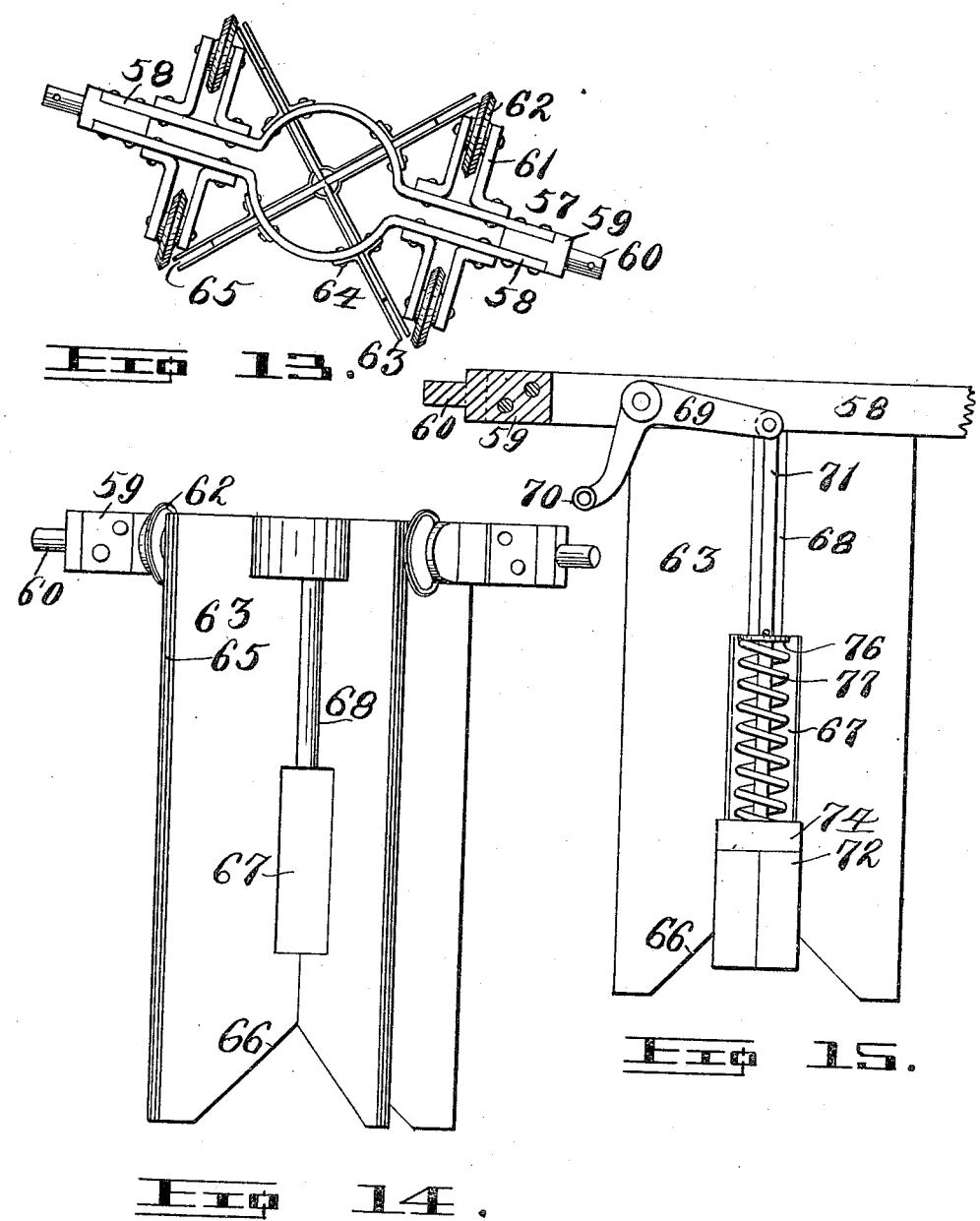

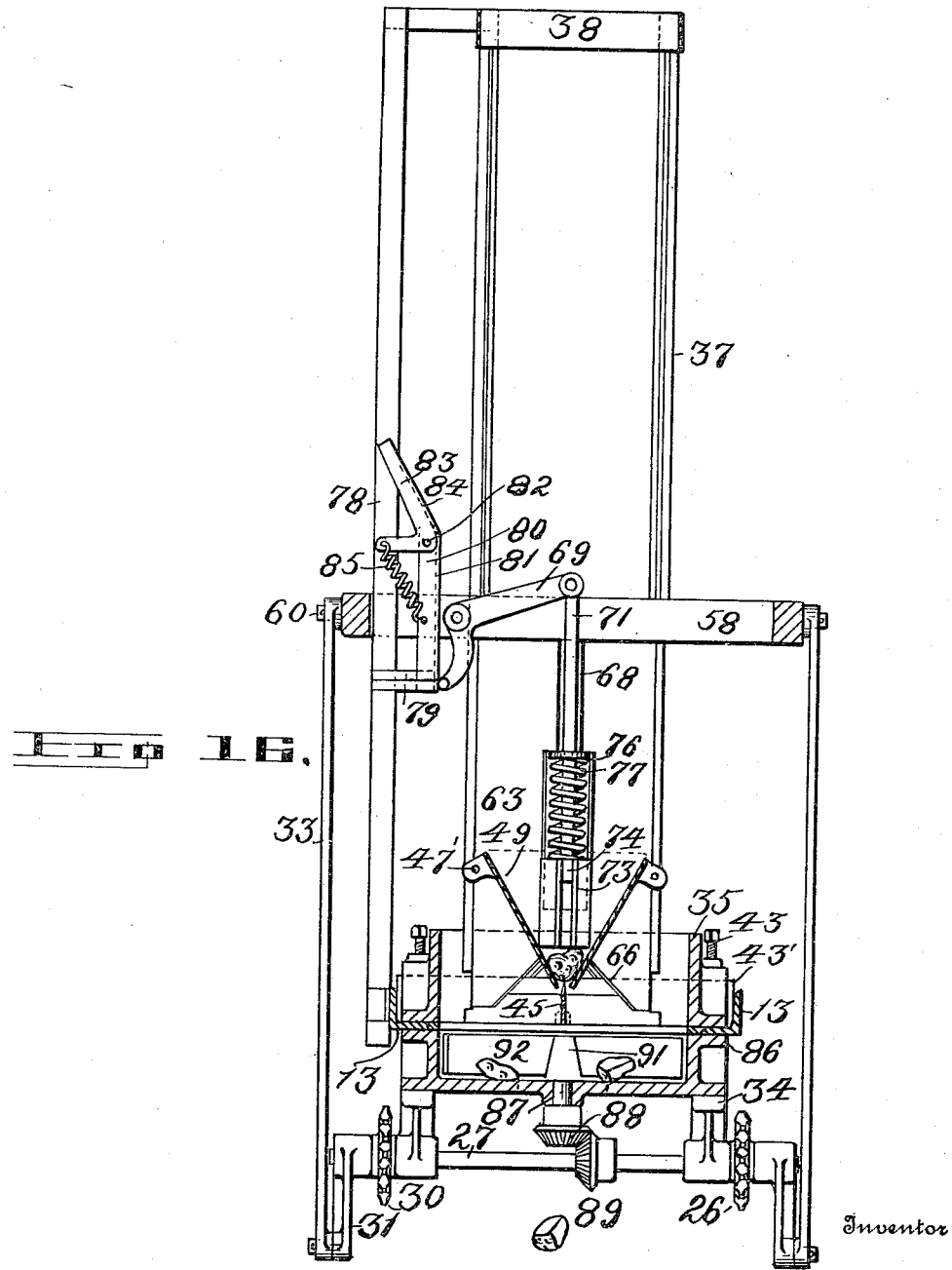

UNITED STATES PATENT OFFICE.

FRANK LAHR, OF BARBERTON, OHIO, ASSIGNOR OF ONE-HALF TO WILLIAM M. THOMAS, OF COVENTRY TOWNSHIP, OHIO.

CUTTER FOR POTATO-PLANTERS.

1,137,870.   Specification of Letters Patent.   Patented May 4, 1915.

Application filed August 19, 1914. Serial No. 857,574.

*To all whom it may concern:*

Be it known that I, FRANK LAHR, a citizen of the United States, residing at Barberton, in the county of Summit and State of Ohio, have invented new and useful Improvements in Cutters for Potato-Planters, of which the following is a specification.

This invention relates to agricultural implements, and more particularly to potato planters and feeding mechanism therefor.

The primary object of this invention is to provide a cutting apparatus for a combined machine for cutting and planting potatoes, wherein the potatoes, fed into a suitable receptacle are automatically forced against a stationary knife and are thereby cut into suitable pieces containing as far as possible eyes or seeds, and which are then successively fed piece by piece into the furrow.

A further and important object of the invention is to provide means whereby the pieces of potato which are cut for seed are freed from the cutting knife and are therefore free to fall to be afterward planted at regular intervals, whereby any sticking or clogging of the pieces on the knife is eliminated and the regularity of their planting is assured.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
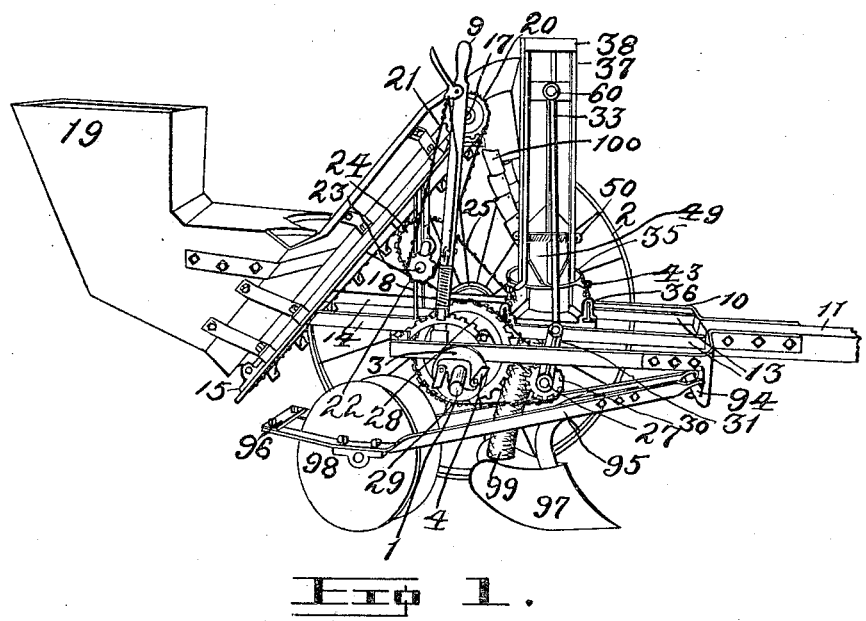
Figure 2:
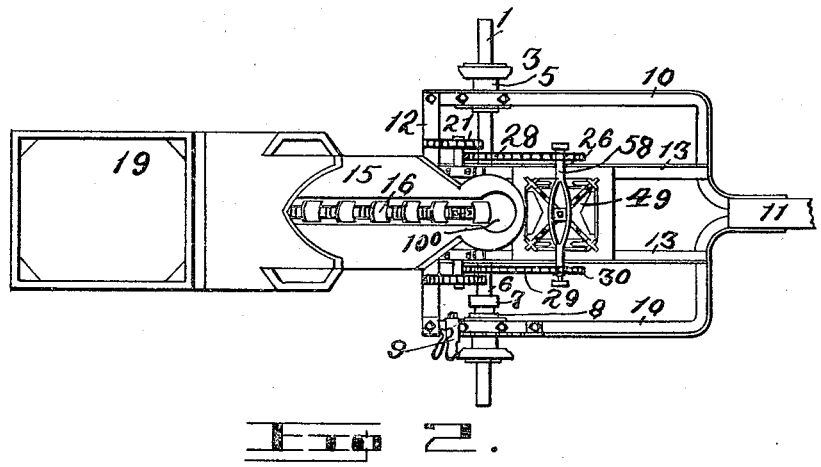

In the drawings in which simillar reference numerals indicate like parts in the different figures, Figure 1, is a perspective view of a potato planter and cutting mechanism embodying this invention with one of the ground wheels removed to more clearly illustrate the mechanism of the device; Fig. 2, is a plan view of the device shown in Fig. 1 with both ground wheels removed; Fig. 3, is a perspective view of a portion of the potato cutting mechanism; Fig. 4 is a perspective view of the upper portion of the feeding mechanism; Fig. 5, is a perspective view of a portion of the mechanism used for holding the potatoes before the cutting operation; Figs. 6 and 7, are perspective views of the knives employed; Fig. 8, is a perspective view of the under face of the feeding mechanism shown in Fig. 4; Figs. 9, 10, 11 and 12 are details of the potato feeding and cutting mechanism; Fig. 13, is a plan view of the mechanism used for forcing the potato against the stationary knife; Fig. 14, is a perspective view of the device shown in Fig. 13; Fig. 15, is a vertical sectional view of the device shown in Fig. 14 with the ejector mechanism shown in connection therewith; and, Fig. 16, is a vertical central, section view enlarged of the potato cutting and feeding mechanism.

Referring to the drawings in detail, the reference numeral 1 denotes the axle of the device on which are loosely-mounted ground wheels 2, one only of which is shown.

The ground wheels 2 are held from transverse movement through the medium of fixed collars 3 each of which bears pawls 4 for engagement with ratchet teeth on the inner faces of the hubs of the ground wheels 2 so that when the device is moved forwardly, the axle will be rotated and when the device is moved rearwardly the pawls run over the ratchet teeth and the axle is stationary.

Loosely mounted on the axle 1 and adjacent to the collars 3 are sleeves 5 and between the sleeves 5 is a smaller sleeve 6 one end of which is provided with a clutch member 7 adapted to be thrown into clutching relation with a clutch member 8 on the axle 1 through the medium of a clutch lever 9.

Secured to the sleeves 5 are a pair of arms 10 which form the frame or carriage of the machine and their front ends are inwardly-bent to connect with and support a tongue 11. Their opposite ends rearwardly of the axle 1 are provided with cross bars 12.

Arranged parallel with the bars 10 are a pair of bars 13 constituting supporting means for mechanism to be later described.

Extending rearwardly of the cross bars 12 are a pair of bars 14 to which is secured an inclined conveyer frame 15 which bears a conveyer belt 16 the upper portion of which runs over a pulley mounted on a shaft 17 mounted at the upper end of the inclined conveyer frame 15. The frame is supported by upright braces 18 on the bars 14.

Secured to the conveyer frame 15 is a hopper 19 into which the seed potatoes are fed and from which they are withdrawn by the conveyer belt 16 and carried upwardly to the cutting mechanism. The shaft 17 bears a sprocket wheel 20 at one end adapted to receive a sprocket chain 21 which runs over a sprocket wheel 22 mounted on a shaft 23 supported in suitable bearings on the upright braces 18. Also mounted on the shaft 23 is a large sprocket wheel 24 bearing a sprocket chain 25 which runs over a sprocket wheel 26 on a shaft 27 which is supported in suitable bearings 34 connected with the bars 13.

Mounted on the sleeve 5 on the main axle 1 is a sprocket wheel 28 which receives a sprocket chain 29 running on a sprocket wheel 30 on the shaft 27.

From the foregoing it will be seen that when the clutch lever 9 is thrown into position to induce clutching relation between the clutch members 7 and 8 the sleeve 5 will be revolved which revolves the sprocket wheel 28 thereby revolving the sprocket wheel 30 and shaft 27 which in turn revolves the sprocket wheel 26 on the shaft 27 and through the sprocket chain 25 motion is communicated to the shaft 22 and through the sprocket wheel 23 by the sprocket chain 24 and sprocket wheel 20 to the shaft 17 for operating the conveyer. The shaft 27 bears at its outer ends a pair of cranks 31 provided with wrist pins 32 to which are attached connecting rods 33.

Mounted on the longitudinal bars 13 is an annular hollow sleeve-like base member 35 provided with vertical peripheral lugs 36 in which are vertically-extending T-shaped grooves in each of which is mounted an upwardly-extending guide 37 all secured together at their upper ends to hold them in parallelism by means of bars 38. The lugs 36 containing the T-shaped grooves are placed diametrically opposite of each other to form the four corners of an imaginary square and the bars 38 are similarly positioned. The bars 37 are provided with inwardly-extending ribs 39 and with outwardly-extending ribs 40 so that the guides are cruciform in cross section. In alinement with the lugs 36 on the base member 35 are radially-arranged lugs 41 through which extend radial openings 42 and in the upper portions of the lugs 41 are set screws 43. The openings 42 are for receiving and holding the potato-cutting knives and in case it is desired to sever the potato into two pieces a single knife 43' is employed having a cross sectional contour appropriate to be received in the openings 42 and the knife extends across the member 35 and is secured in oppositely-disposed openings 42 in the lugs 41. These knives are provided with bosses 44 to receive the lower ends of set screws 43 for holding them detachably in position. If it is desired to divide the potato into more than two pieces, auxiliary knives 45 are employed which are inserted in the intermediate openings 47 and extend inwardly to and contact with the median portion of the knife 43 so that if these knives 45 are employed extending, as they do, from opposite sides, the potato will, under normal conditions, be divided into four pieces. Secured above the base member 35 to a portion of the ribs 40 are brackets 46 each provided with an aperture to constitute a bearing for a shaft 47 the opposite end 48 of which is secured in an aperture in the opposite rib 40.

Mounted on each of the shafts 47 which, as before stated, extend between two of the guides 37, is a gate 49 provided with outwardly-projecting ears 50 suitably apertured to receive the shaft 47. On the shaft is a coiled spring 51 one end of which is anchored to the lug 50 and the opposite end in a squared enlargement 52 of the shaft 47 which is provided with openings 53 to receive a pin 54 for rotating the shaft for regulating the tension on the spring 51 and the pin 54 is secured against reverse rotation by engagement with an abutment 55 forming the end of the bracket 46.

Extending through the side wall of the base member 35 are bolts 56 each of which passes through one of the gates 49 and which are provided with nuts to regulate the inward movement of the gates, the nuts constituting abutments for preventing the gates from approaching the axial line of the base member 35. Under normal conditions the lower pointed ends of the gates 49 will point inwardly toward each other and toward the axial line of the base member 35 but will be held from actual contact with each other by means of the bolts 56 to thereby provide radial openings between coadjacent gates. Positioned above the gates 49 is a yoke constituting a cross head which consists of a pair of cross bars 58 arranged in spaced relation and with their centers fashioned to form approximately semi-circular curves so that when positioned they produce a broken annulus. The ends of the bars 58 are secured to head 59 of wrist pins 60 which are adapted to receive the upper ends of the connecting rods 33 so that as the connecting rods are reciprocated by the cranks 31 the cross head 57 will be vertically reciprocated.

Secured to the bars 58 are two pairs of brackets 61 with the members of each pair oppositely disposed to one another and arranged on opposite sides of the bars 58 and projecting in opposite directions. The two pairs of brackets 61 are placed on opposite sides of the annular portion of the cross head and between the members of each pair of brackets are friction-reducing rollers 62 adapted to run in the V-shaped groove formed at the angles between the main portions of the guides 37 and the inwardly-projecting ribs 39, so that as the cross head is vertically reciprocated it is guided by engagement of the rollers 62 in these grooves. The cross head is adapted to carry the device for forcing the potatoes successively downwardly between the doors 49 and into engagement with the knives for dividing them into a plurality of pieces.

The structure for accomplishing this function comprises four plates 63 bent into a right-angular formation and each secured at 64 to the annular central portions of the bars 58 and with the opposing faces of the various plates 63 arranged in spaced relation and in parallelism to thereby provide vertically-extending openings 65 between coadjacent plates. The openings 65 are adapted to receive the inwardly-extending ribs 39 of the guides 37 to assist in guiding the device during its vertical reciprocation with the cross head 57. The lower central portions of the plate 63 are truncated at 66 and the inner truncated portions meet at the central axial line of the device. The inner portions of the members 63 are severally cut away near their vertical median portion to provide an opening 67 and above this the various members 63 are outwardly bent upon curvilinear lines to form a vertical opening 68.

On one of the cross bars 58 is pivotally secured a bell-crank 69 the free end of which is equipped with a roller 70 and the opposite end is pivotally connected with a stem 71 to the lower end of which is secured an ejector 72 and shown best in Fig. 10. This ejector consists of four plates 73 in the form of right angles and arranged so as to provide a cruciform structure in cross-section and secured at their upper ends to a cruciform head 74 which constitutes a member for holding the plates 73 in spaced relation to provide openings 75. The stem 71 bears a collar 76 and between it and the head 74 is a coiled spring 77. The plunger is disposed by placing the members 73 so that the openings 75 between them will receive the several members 63 to permit the ejector 72 to be vertically reciprocated with the members 63 constituting guides for this purpose. The collar 73 will engage the edges of the member 63 at the upper portion of the openings 67 so that as the end of the bell-crank 69 is shifted inwardly and the stem 71 raised to raise the ejector 72 the spring 77 is compressed and upon a release of pressure against the roller-bearing end of the bell-crank 69 the spring will force the ejector downwardly, so that its lower end projects into the space formed by the truncated portions 66 of the device.

Secured near its lower end to one of the bars 13 and at its upper end to the braces 38 is an upwardly-extending bar 78, on which are cross bars 79 to support a tappet bar 80 (see Fig. 12) provided along one of its inner faces with a vertically-extending groove 81. Secured pivotally to the upper end of the tappet bar 80 at 82 is an L-shaped releasing member 83 provided with a lateral rib 84 arranged so as to aline with the groove 81 when the main portion 83 is in its vertical position. Secured to the opposite arm of the member 83 is a coiled spring 85 for normally holding the working edge of the member 83 at an inclination with respect to the bar 80.

Secured to the under face of the bar 13 in vertical alinement with the member 35 is a cup-shaped member 86 adapted to constitute a distributing chamber for the pieces of potato which fall therein. Centrally arranged in the lower wall of the member 86 is a bearing in which is mounted a vertical shaft 87 bearing on its lower end a bevel gear 88 adapted to mesh with a bevel gear wheel 89 on the shaft 27 and receive motion therefrom. The lower wall of the member 86 is further provided with an opening 90 which constitutes the escape opening for the pieces of potato.

On the shaft 87 within the member 86 is a hub 91 from which extend a plurality of radial blades 92 with their outer ends preferably slightly curved in the direction of rotation of the shaft 87. Secured on a bar 94 extending across the front of the machine (see Fig. 1) are a pair of rearwardly-extending arms 95 arranged to diverge from each other and be connected at their rear ends by a cross bar 96.

Mounted on the front ends of the bars 95 is a furrow-opener 97 of ordinary construction and pivotally secured to the bars 95 rearwardly of the furrow-opening are a pair of ordinarily-constructed covering wheels 98. From the opening 90 in the distributing box 86 extends a tubular conveyer 99 for conveying the severed pieces of potato into the furrow in the rear of the furrow-opener 97. Extending from the top of the belt conveyer frame 15 is a conveyer 100 adapted to deliver the whole potato onto the upper faces of the gates 49 and when they are delivered by the conveyer 16.

In operation the device is as follows: A quantity of seed potatoes are placed in the hopper 19 and the device transported to the field for use, during which time the clutch members 7 and 8 are disengaged from each other so that the mechanism will not operate. In using the device for the planting of potatoes the clutch lever 9 is operated to induce clutching relation between the members 7 and 8 and the device is propelled in the usual manner. The potatoes, one by one, are carried upwardly by the conveyer belt 16 and fall by gravity through the tubular conveyer 100 and upon the upper faces of the gates 49 and as these are inwardly-inclined and inclined toward each other the potato centers itself at the bottom of the receptacle so formed and immediately over the knives 43' and 45. The cranks 31 are constantly revolved by mechanism, already described, which reciprocates the cross head 57 and as it descends the members 63 pass downwardly through the openings between the gates 49 and the truncated portions 66 of the device engage the potato and further tend to center and hold it securely. During the downward movement of the cross head the friction roller 70 rides over the tappet bar 80 but at practically the termination of the lower end of the stroke of the cross head the roller 70 runs off from the face of the tappet bar 80 and releases the spring which imparts to the ejector 72 a quick, downward movement which drives the potato downwardly over the knives, cutting them into a plurality of pieces. The downward movement of the knives is permitted by reason of the fact that the openings 75 in the ejector pass the knives freely and the stroke of the plunger carries it downwardly far enough to thoroughly clear the pieces of potato from the knives. As the plunger moves on its upper stroke the roller 70 runs in the groove 81 on the tappet bar 80 and is held from movement thereby. As it leaves the bar 80 it engages the rib 84 on the member 83 and overcoming the spring 85 shifts the device into alinement with the tappet bar 80 and this is continued until the roller runs over the end of the rib 84 and in position to engage the inner face of the tappet bar 80 on its return stroke. The pieces of potato fall into the distributer 86 and are delivered one by one into the opening 90 by means of the blades 92, from which they pass through the conveyer 99 into the furrow in the rear of the furrow-opener 97, after which the furrow is closed by the furrow-closing wheels 98.

I claim:—

1. A potato cutter embodying upright guides, a plurality of spring-pressed downwardly projecting gates inclined toward each other and arranged when in their normal position to constitute a potato-receiving and centering receptacle, means to feed potatoes into said receptacle, a reciprocating plunger on said guides adapted when moved to its lower position to pass between said gates and engage the potatoes, a cutting knife below said receptacle, an ejector carried by said plunger, means to hold said ejector in its upper portion during the downward stroke of said plunger, said means permitting a sudden downward movement of said ejector at the termination of the lower stroke of said plunger to permit said plunger to engage the potatoes for forcing them past said knife during the severing operation.

2. A potato cutter embodying upright guides, a plurality of spring-pressed downwardly projecting gates inclined toward each other mounted on said guides and arranged to form a temporary receptacle, means to feed potatoes to said receptacle, a reciprocally-acting plunger approximately cruciform in cross section with the outer portions thereof adapted to slide on said guides, a cross-head on said plunger, means for reciprocating said cross head and plunger, a vertically-shiftable ejector positioned centrally of said plunger, a spring for forcing said ejector downwardly, means to hold said ejector in its upper position during the downward movement of said plunger, and means to release said holding means to permit the spring to force said ejector suddenly downwardly at the lower termination of the stroke of said plunger, a cutting knife positioned below said receptacle and in the path of the downwardly-moving potatoes.

3. A potato cutter embodying upright guides, a plurality of spring-pressed downwardly and inwardly-inclined gates arranged when assembled to form an inverted pyramidally-shaped receptacle with spaces interventing between the edges of coadjacent gates, means to feed potatoes to said receptacle, a reciprocally-moving plunger mounted on said guides and arranged when moved to its lower position to pass between said gates and engage the upper faces of a potato in said receptacle and force it therefrom, a cutting knife below said receptacle to engage and sever the potato into pieces, an ejector carried by said plunger, means for imparting to said ejector a sudden downward stroke at approximately the time the plunger reaches the termination of its lower stroke for driving the severed pieces from said knives.

In testimony whereof I have hereunto set my hand in presence of two subscribing witnesses.

FRANK LAHR.

Witnesses:
 WILLIAM M. THOMAS,
 C. E. HUMPHREY.

Copies of this patent may be obtained for five cents each, by addressing the "Commissioner of Patents, Washington, D. C."